United States Patent [19]

Andersson

[11] Patent Number: 4,932,516

[45] Date of Patent: Jun. 12, 1990

[54] CONVEYOR BELT CRADLE ASSEMBLY

[75] Inventor: Sven E. Andersson, Sandy, Utah

[73] Assignee: Baker International Corporation, Orange, Calif.

[21] Appl. No.: 197,106

[22] Filed: May 20, 1988

Related U.S. Application Data

[63] Continuation of Ser. No. 885,215, Jul. 14, 1986, Pat. No. 4,793,470.

[51] Int. Cl.⁵ ............................................. B65G 15/08
[52] U.S. Cl. .................................. 198/823; 198/841; 198/861.1
[58] Field of Search .............. 198/823, 826, 841, 818, 198/861.1, 827, 842

[56] References Cited

U.S. PATENT DOCUMENTS

| | | | |
|---|---|---|---|
| 1,516,666 | 11/1924 | Briggs | 198/826 |
| 1,530,499 | 3/1925 | Knode | 198/826 X |
| 3,362,523 | 1/1968 | Stone | 198/826 |
| 4,144,964 | 3/1979 | Valcalda | 198/827 X |
| 4,793,470 | 12/1988 | Andersson | 198/823 |

FOREIGN PATENT DOCUMENTS

| | | | |
|---|---|---|---|
| 0046425 | 2/1982 | European Pat. Off. | 198/823 |
| 0926658 | 3/1955 | Fed. Rep. of Germany | 198/826 |
| 1134026 | 7/1962 | Fed. Rep. of Germany | 198/827 |
| 0260569 | 1/1971 | U.S.S.R. | 198/823 |
| 0602423 | 4/1978 | U.S.S.R. | 198/823 |
| 0742286 | 6/1980 | U.S.S.R. | 198/823 |

Primary Examiner—Robert J. Spar
Assistant Examiner—D. Glenn Dayoan
Attorney, Agent, or Firm—Trask, Britt & Rossa

[57] ABSTRACT

A cradle assembly having longitudinal slats for supporting a conveyor belt, especially a troughed conveyor belt, in which the cradle may be folded or readily partially disassembled for easy original installation as for retrofitting into an existing conveyor belt system is disclosed.

10 Claims, 4 Drawing Sheets

CONVEYOR BELT CRADLE ASSEMBLY

This is a continuation of application Ser. No. 885,215, filed July 14, 1986 now U.S. Pat. No. 4,293,470.

BACKGROUND OF THE INVENTION

1. Field:

This invention relates generally to slat or bar-type support systems for conveyor belts especially for use under a loading zone of the conveyor belt and especially for "V" or "U"-shaped conveyor belts.

2. Prior Art:

Existing slat or bar-type support assemblies are constructed in place, often times being constructed prior to the installation of the conveyor belt With flat belts, the slat or bar support system may be readily installed after the belt is in place. However, with deep "V"-shaped belt conveyors the distance between the overhead loaded belt and the lower return belt is such that a preconstructed "V"-shaped slatted support assembly will not fit between the belts for installation. Thus, the practice has been to construct such "V"-shaped slatted support systems in place, or to remove the belt while the slatted support system is put in place. Also, once a preconstructed "V"-shaped slotted support assembly is in place, it is difficult to remove the bar-like or slat members since these usually are removed longitudinally inasmuch as a groove runs the length of a slat so that it may be slid over a "T"-shaped bolt to remove the slat. However, once the system is in place, idler rollers, which are usually adjacent to either end of the slotted support assembly, prevent the bars from being slid longitudinally. The bars have a wear surface, which are usually plastic, teflon or other hard smooth plastic coating over a rubber mid-section supported by a steel base. While the plastic surface is wear resistant, the bars need to be replaced periodically. When it is necessary to replace the bars, then the whole assembly must be again disassembled or the belt removed or the idler pulley which is on either end of the slatted support member must be removed.

SUMMARY OF THE INVENTION

A cradle assembly is disclosed herein having slatted or bar-type support members for supporting a conveyor belt in which two or more bars are constructed on a cross-member to form a cradle subassembly. At least one subassembly of at least two or more subassemblies present per cradle unit is readily detachable to permit a "V"-shaped cradle assembly to be installed to support a "V"-shaped belt after the belt has been installed. This cradle assembly is also useful in new installations prior to assembly and installation of the conveyor belt inasmuch as the cradle assembly, or at least a subassembly thereof, may be readily removed sot hat the bar-like support members may be replaced without removing the belt or removing idler pulleys.

The cradle assembly of this invention comprises at least two transverse beam members and at least two cradle subassemblies or bar-like members attached to the transverse beam members, either in a replaceable manner or with a hinge for each near the mid-point of the transverse beam members. A cradle subassembly comprises at least two cross-members to which elongated bar-like members are attached perpendicularly.

A typical cradle support system comprises two or more transverse main beam members with a central cradle subasembly containing two or more elongate bar-like support members attached perpendicularly to cross-member supports, wherein the cross-members are supported on or adjacent to, and substantially co-extensive with, a portion of the transverse beam members. This central subassembly has a generally flat overall upper surface such that it would support the bottom of a "U"-shaped or trough shaped conveyor belt. On either side of the central cradle subassembly is another cradle subassembly which may be hinged on either side of the central subassembly with removable or hinged struts, whereby the outboard subassemblies which may be inclined so that the outboard or wing cradle subassemblies then form a generally "U" or "V"-shaped trough in conjunction with the central cradle subassembly to support a troughed conveyor belt.

The cradle support assemblies of the instant invention for supporting conveyor belts, especially troughed conveyor belts, are particularly advantageous inasmuch as these assemblies may be retrofit into existing conveyor belt installations, and are adapted to be readily removed from conveyor belt installations without disassembly of the conveyor belts These cradle assemblies are further adapted to fit into the small space existing between the load and return belts in most trough belt installations wherein very little vertical space exists between the top and bottom runs of the conveyor belt

BRIEF DESCRIPTION OF THE DRAWINGS

Further description of the invention may be facilitated by reference to the attached drawings.

DETAILED DESCRIPTION OF THE PREFERRED EMBODIMENT

Figure 1:
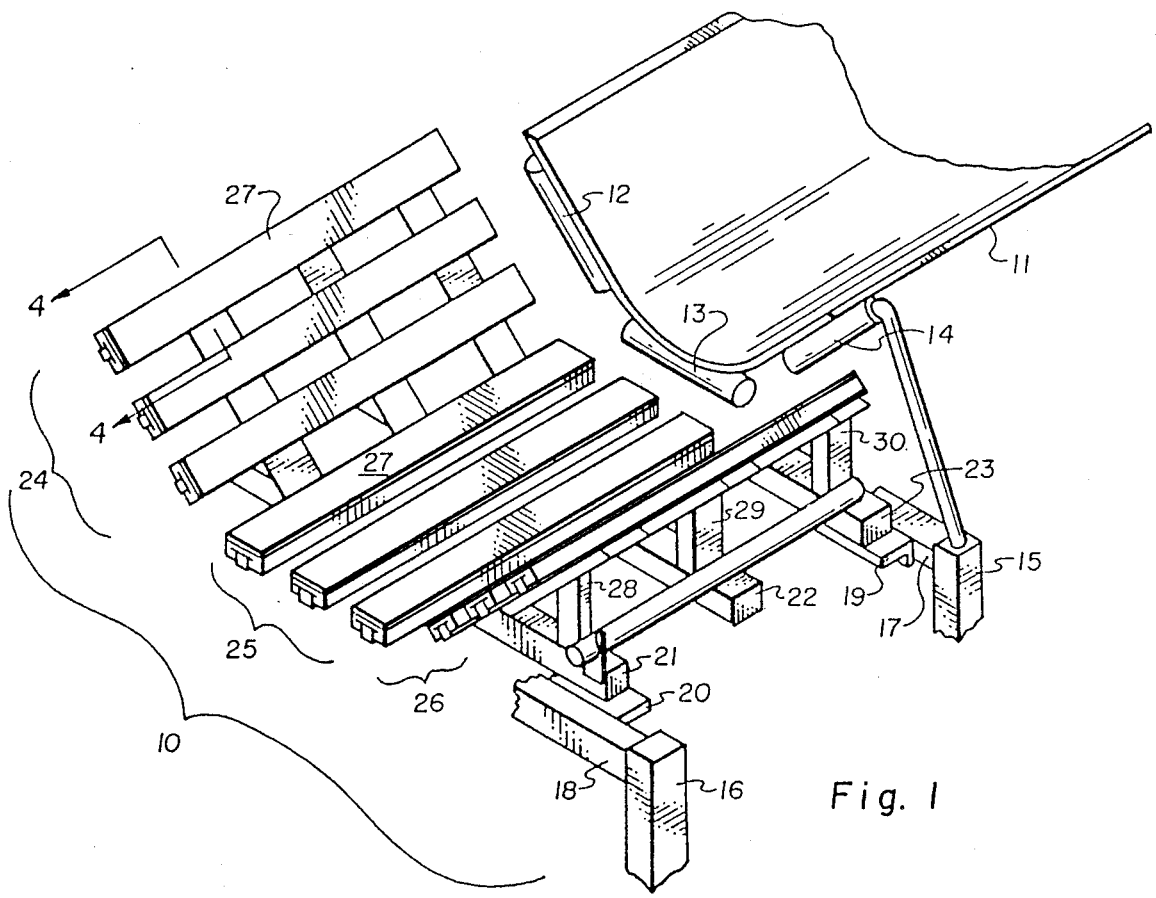
FIG. 1 is a perspective view of a "V" shaped cradle assembly with folding wing members having bar or slat-type longitudinal support members.
Figure 2:
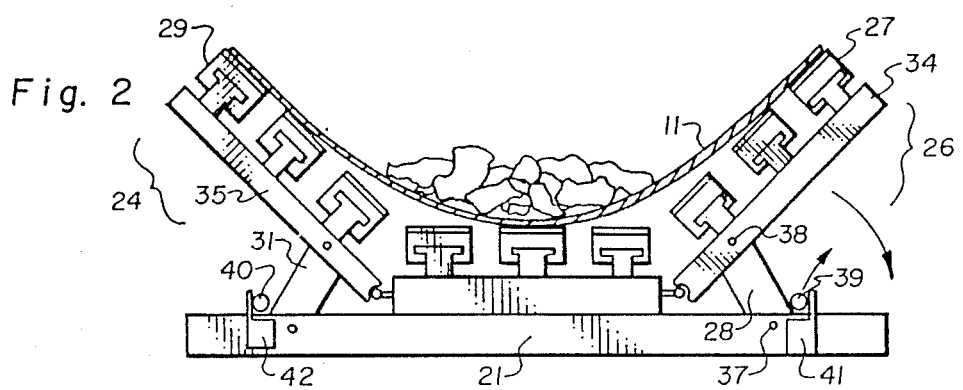
FIG. 2 is an elevational, end view of the cradle assembly of FIG. 1 with both wing assemblies in an inclined position.
Figure 3:
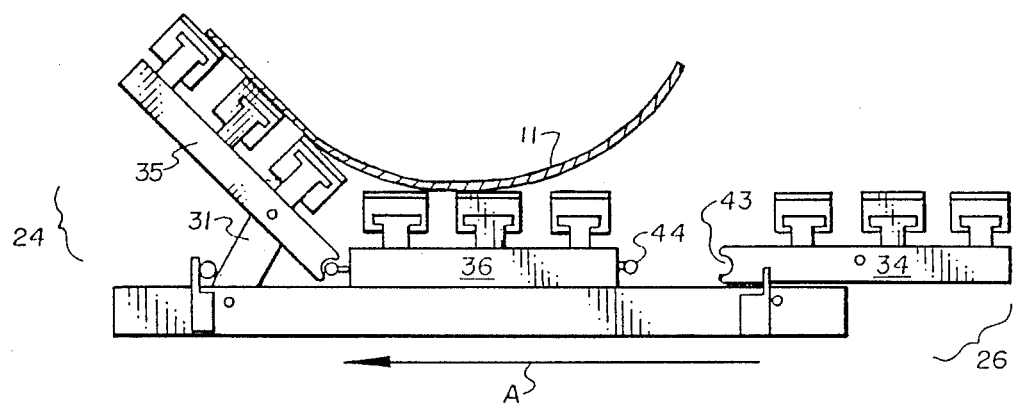
FIG. 3 is an elevational end view of the cradle assembly of FIG. 1 with one wing assembly in a folded position.

FIGS. 1, 2 and 3 are different views of the same cradle assembly for supporting troughed conveyor belts FIG. 1 is a perspective view of the cradle assembly 10, while FIG. 2 is an end on elevational view of the cradle assembly of FIG. 1, and FIG. 3 is an end on view of the cradle assembly of FIG. 1 with one cradle subassembly, i e., a wing assembly, in a disengaged position.

In FIG. 1, the cradle assembly 10 is illustrated with a partial view of a conveyor belt 11 and idler rollers 12, 13 and 14 which, when the cradle assembly is in position to support a troughed conveyor belt, are generally proximate to either end of the cradle assembly. Support posts 15 and 16 are members of the conveyor belt's main installation structure and are not part of the cradle assembly. These support posts 15 and 16 exist to support the idler rollers. These support posts, in conjunction with existing beams members 17 and 18 which tie these support posts together, may be used further to support the cradle assembly when it is placed in condition. In FIG. 1, a pair of angle iron members 19 and 20 are shown attached to the cross-beams 17 and 18 to provide support for the cradle assembly.

The cradle assembly 10 utilizes three transverse cradle support beams 21, 22 and 23. These cradle support beams 21, 22 and 23 have a length which is generally approximately the width of the conveyor belt which the cradle assembly supports. These cradle support beams, of course, may be longer than the width of the belt, if desired. Attached to said transverse cradle support beams 21, 22 and 23 are three cradle subassemblies 24, 25 and 26. These cradle subassemblies are very similar in structure with outboard subassemblies 24 and 26, also referred to as wing assemblies, being substantially identical except that one may be the mirror image of the other, although they may be constructed identically.

Attached to each cradle subassembly are slats or bar-like members 27, which cradle assembly illustrated in FIGS. 1, 2 and 3 are identical in character and dimensions. Outboard cradle subassemblies 24 and 26 are inclined with reference to the central subassembly 25 and are supported in such an inclined position by struts 28, 29 and 30 supporting cradle subassembly 26 while struts 31, 32 and 33 support cradle subassembly 24. These latter struts are not visible in FIG. 1, but strut 31 is illustrated in FIGS. 2 and 3.

In FIG. 2, the cradle assembly is illustrated with the outboard cradle subassemblies 24 and 26 in an inclined position supported by struts 28, 29, 30, 31, 32 and 33. These struts are hinged respectively to transverse cradle beam members 21 and to cross-members 34 by pin members such as pin members 37 and 38. These outboard cradle subassemblies 24 and 26 are locked into position by bars 39 and 40, which are held in place by stop or riser members 41 and 42 which have a vertical component rising above the upper surface of the beam member 21 so that the bars are held in place.

As illustrated in FIGS. 2 and 3, cradle subassembly 26 has a notch 43 in the end of cross-member or arm 34. Notch 43 is sized to interact with a spur or rod 44 which projects from and runs substantially perpendicular to cross-member 36. Thus, the interaction of notch 43 with elongated rod 44 forms an open hinge arrangement. However, when locking bar 39 is in place, then the assembly is a substantially rigid cradle assembly. However, as can be discerned from FIG. 3, when subassemblies 24 and 26 are both in a flat position, then the whole cradle assembly may be readily slid from under the belt, for example, slid to the left as shown by arrow "A" so that the whole cradle assembly may be installed or removed without disturbing other permanent structures supporting the belt or without disturbing the belt or idler rollers.

The cradle assembly illustrated in FIGS. 1, 2, and 3 is a particularly useful construction inasmuch as the wing or outboard cradle subassemblies 24 and 26 not only fold to achieve a substantially flat, planar relationship with the central subassembly 24, but subassemblies 24 and 26 swing away from subassembly 25 so that the bar-like members 27 are substantially remote from the conveyor belt and conveyor belt superstructure to facilitate maintenance to or replacement of said bar-like members.

An alternative structure to that illustrated in FIGS. 1, 2 and 3 is one in which the wing or outboard subassemblies are hinged at or near their interior edges so that the subassemblies may fold flat but do not swing away from the central subassembly. This may be accomplished by hinging the cross-members 34 to post 44 and having strut 28 notched on one or both ends so that strut 28 may be readily detached from either arm 34 or main beam 21 when it is desired to lower subassembly 26.

Figure 4:
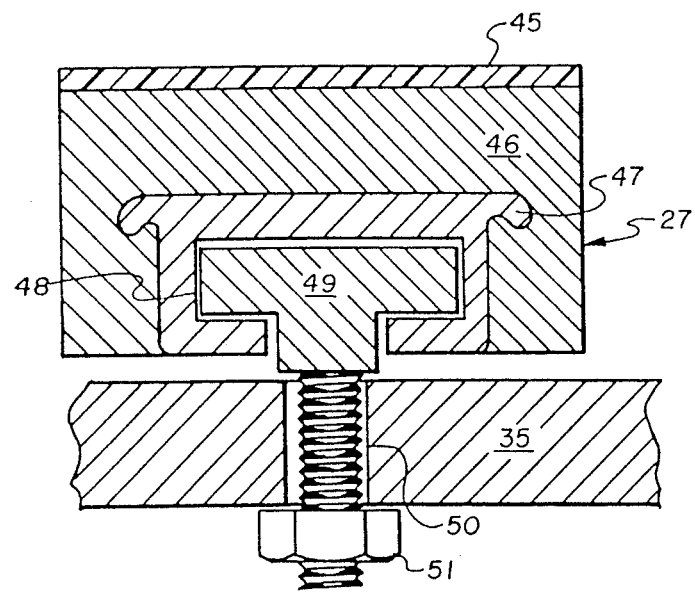
FIG. 4 is a detailed elevational end view of the attachment means for attaching a bar support member to a cross-member of a cradle.

The manner of attaching impact bars 27 to cross-member 35 is illustrated in FIG. 4, which is an elevational end view. Bar 27 is composed of a top surface layer 45 of a very tough, smooth-surfaced, low friction material such as teflon, certain polyurethane compositions and other plastic materials. The core 46 of the bar is generally of a rubbery material. The rubber material is intended to be an impact absorber. The rubber core 46 is generally formed around an extruded metal member 47, such as an aluminum extrusion, which generally runs the length of the bar. The aluminum, or other metal extrusion 47, forms the primary structural support member of the impact bar 27. Also, the aluminum extrusion 47 has a "T"-shaped open channel which forms or acts as a receptacle for the head of a bolt 49 which may be slid into the channel, passed through a bolt hole 50 in cross-member 35 and then, with nut 51 tightened in place, holds the impact bar in position. Bolt 49 generally has a square head so that the bolt is held motionless while nut 51 is tightened or removed from the bolt.

Figure 5:
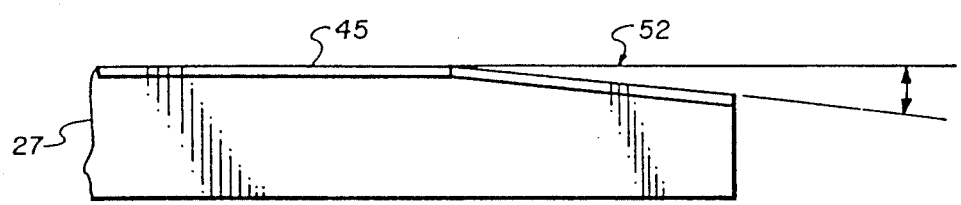
FIG. 5 is an elevational, side view of one end of a bar support illustrating a tapered bar surface.

An elevational side view of impact bar 27 is illustrated in FIG. 5 showing one end of the bar having a tapered upper surface 52. This tapered upper surface is generally oriented such that the belt passes over the bar in a direction of right to left so that any seams or joints etc. in the belt do not catch on the end of the bar as the belt passes over the top of the bar.

Figure 6:
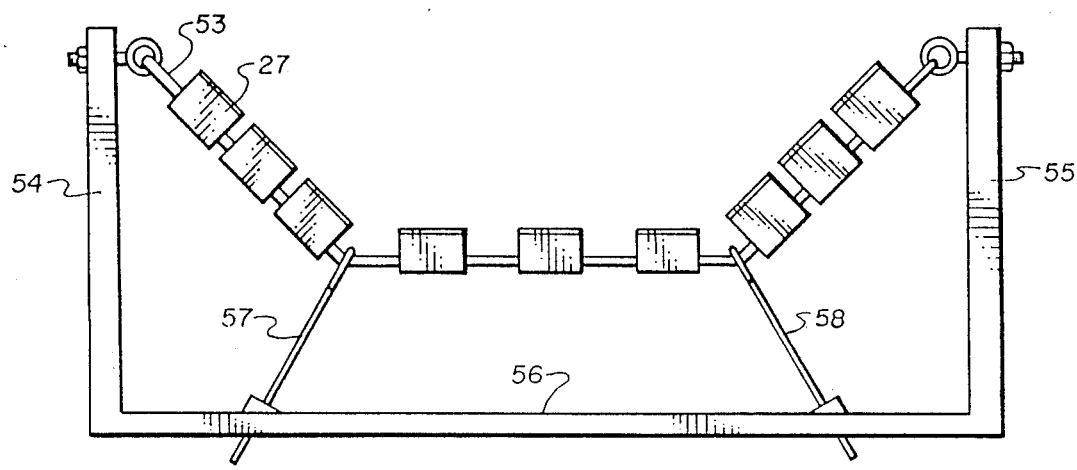
FIG. 6 is an elevational end view of a cable-supported cradle assembly for supporting a troughed conveyor belt.

Another support system for trough conveyor belts is illustrated in FIG. 6 wherein the impact bars 27 are supported on a cable 53. The terminal ends of the cable are attached to posts 54 and 55 which are attached to the ends of beam member 56. Eye bolts 57 and 58 are positioned to interact with the cable to form the cable bar assembly into a generally trough-like shape.

Figure 7:
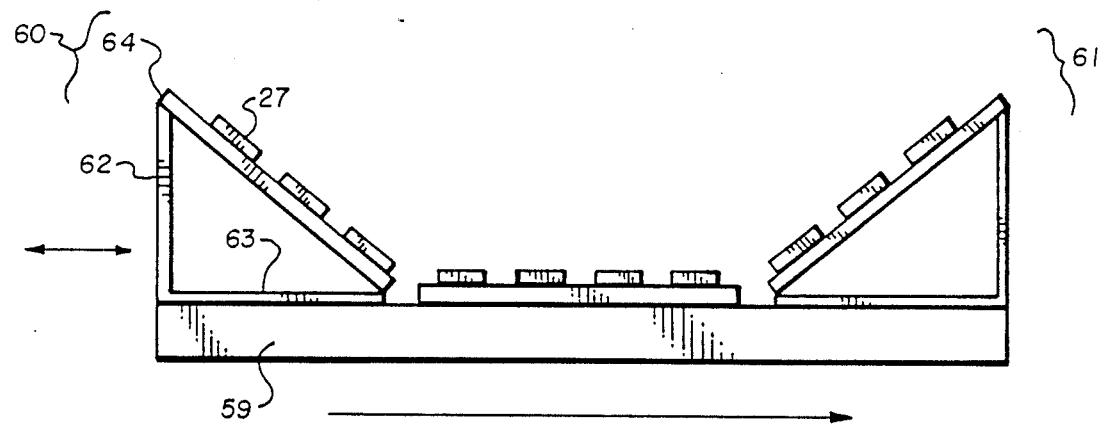
FIG. 7 is an elevational, end view of a cradle assembly with a transverse readily removable wing subassembly having a fixed, inclined surface.

In FIG. 7 another cradle assembly is illustrated for use with troughed belt conveyors whereby the cradle assembly may be retrofit into an existing conveyor belt installation. A transverse beam 59 forms one support member for the system. A subassembly 60 and another subassembly 61 are made to form wing members to support the conveyor belt. Cradle subassembly 60 is formed of rigid support members 62 and 63 with a cross-member 64 supporting bars 27 Member 63 is designed to be replaceably attached to transverse beam 59 such that the whole subassembly 60 may be slid in and out of position whenever bars need to be replaced. Thus, by having subassembly 60 removable from beam 59, then the whole remaining cradle assembly, which includes subassembly 61 and the bar 59, may be slid or removed to the right so that they may be removed from an existing trough belt conveyor without disturbing any of the super structure or the belt.

Figure 8:
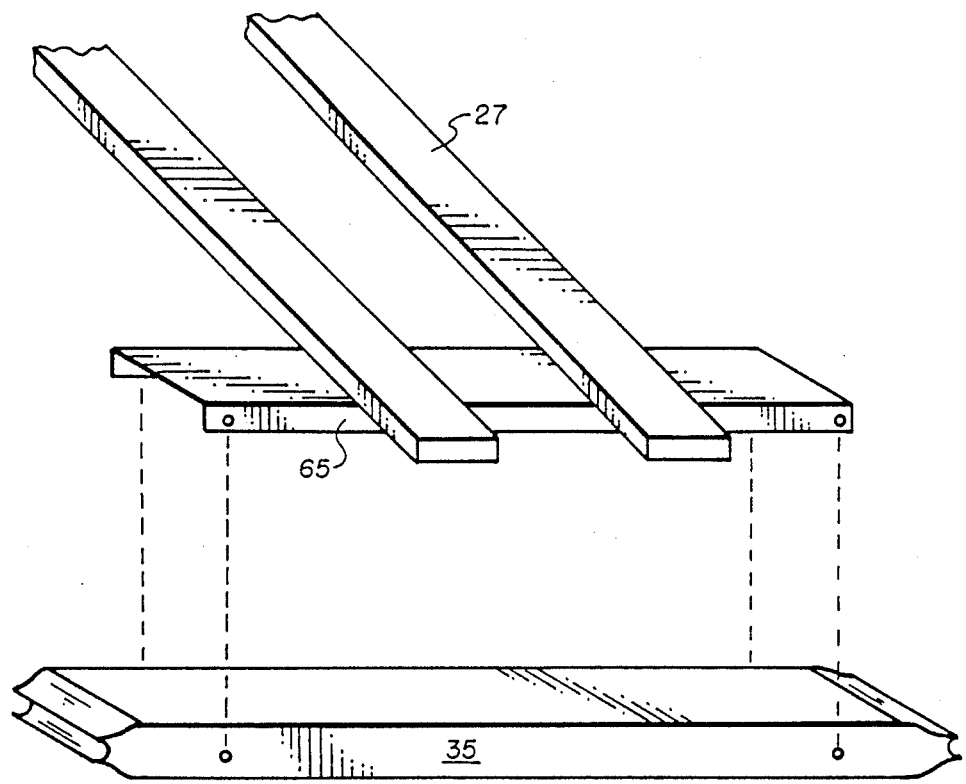
FIG. 8 is an exploded view of a bar support unit having a plurality of support bars attached to a channel member which is removably attached to a supporting cross-member of a cradle assembly of the type illustrated in FIG. 1.
Figure 9:
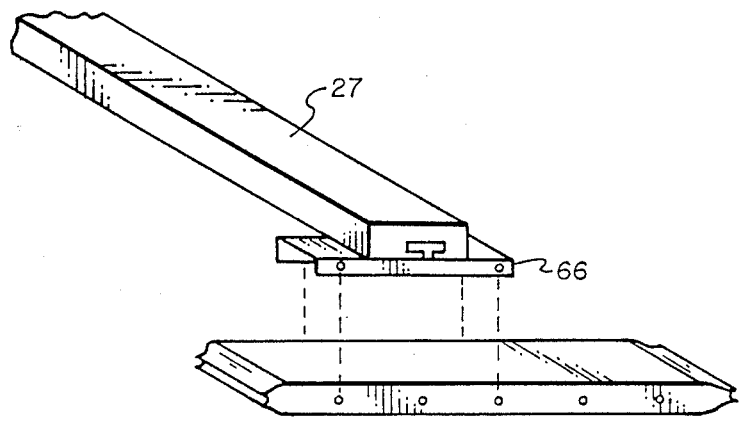
FIG. 9 is an exploded view of a single bar support member attached to a channel member adapted to interact in the same manner as the unit illustrated in FIG. 8.

FIGS. 8 and 9 illustrate additional sub-units for use in a cradle assembly to support a troughed conveyor belt or to support any other configuration of the belt.

In FIG. 8, a channel member 65 has attached to it two or more bar-like members 27. The bar members may be attached to the channel members so that there is no substantial protrusion which exists down into the open area between vertical walls of the channel member. The channel member is adapted to fit over cross-member 35. In this embodiment, a plurality of impact bars may be attached to a channel member. When it is time to replace the impact bars on a subassembly, the channel member may be attached by bolts, pins or other means to the cross-member so that the whole unit (channel member and bars) may be removed from the cross-member. By having a plurality of impact bars attached to a channel member, such as channel member 65, then the channel and bars may be slid outwardly, see FIG. 3, i.e. transversely to the belt, so that each bar need not be removed completely longitudinally from the subassembly. In this fashion, even the bars attached to central cross-member 36 (FIG. 3) could be moved laterally or transversely to the belt without removing any further portion of the cradle or assembly.

FIG. 9 illustrates a sub-unit similar to FIG. 8 except that each impact bar 27 is fitted with an individual channel member 66 so that each individual bar may be replaced, but again replaced by sliding the bar transversely to the direction of travel of the conveyor belt.

I claim:

1. A conveyor belt cradle assembly for supporting a conveyor belt under a loading zone and above a mounting surface, said conveyor belt having a direction of travel, said cradle assembly comprising:
    a support member;
    a pair of wing-like support subassemblies mounted on said support member, each said subassembly having an elongate cross-member, supported on each of its opposing ends by its respective said support subassembly, said cross-member being adapted to support a conveyor belt slidingly positioned thereon, said cross-member being oriented at an inclined angle to said support member such that an outboard portion of each said cross-member is at a higher elevation than an inboard portion thereof; one of said support subassemblies being removably mounted to said support member, allowing said subassembly to be removed from said support member, an association of said support member with said subassemblies constituting a generally "U"-shaped structure suitable for supporting a conveyor belt in a generally "U"-shaped orientation;
    wherein said support member is adapted to be slidably displaceable on said mounting surface, said cradle assembly being dipslaceable laterally of said conveyor belt's direction of travel upon removal of said detachable subasembly from said support member.

2. The cradle assembly according to claim 1 wherein at least one said support assembly is mounted to said support member.

3. The cradle assembly according to claim 1 wherein each of said cross-members is fitted with at least one elongate impact bar to define a sliding surface for said conveyor belt, a longitudinal axis of each said impact bar being oriented parallel to said direction of travel of said conveyor belt.

4. A conveyor belt cradle assembly for use in supporting a conveyor belt in a loading zone and above a mounting surface, said conveyor belt having a direction of travel, said cradle assembly comprising:
    a support member;
    at least one support subassembly removably mounted on said support member, said at least one support subassembly including an elongate cross-member, said cross-member having opposite ends, each of said ends being mounted on and supported by said cross-member's respective said subassembly, residing at an inclined angle to said support member such that an outboard portion said cross-member is at a higher elevation than an inboard portion thereof, an association of said support member and said at least one support subassembly constituting a structure suitable for supporting a conveyor belt in a non-planar orientation;
    wherein said support member is adapted to be slidably displacable on said mounting surface, said cradle assembly being dipslaceable laterally of said conveyor belt's direction of travel upon removal of said detachable subasembly from said support member.

5. A conveyor belt cradle assembly for supporting a conveyor belt in a loading zone, said conveyor belt having a direction travel, said cradle assembly comprising:
    an elongate base support positioned substantially orthogonal to said direction of travel;
    a pair of upright supports mounted spacedly apart from one another on said base support;
    a pair of horizontal supports mounted spacedly apart from one another on said base support, each horizontal support being mounted on a respective said upright support;
    a pair of angulated supports, each angulated support having a first end mounted on and supported by a respective upright support, and a second opposing end mounted on and supported by a respective horizontal support wherein a support subassembly formed by a respective horizontal support, upright support and angulated support form a triangle-shaped structure; and
    a plurality of elongate impact bars mounted on said angulated supports, a longitudinal axis of each said impact bar being oriented to extend parallel said direction of travel;
    wherein one of said support subassemblies are spacedly mounted on said base support to define a generally "U"-shaped structure; and
    wherein one of said support subassemblies is removably mounted to said base support.

6. The cradle assembly of claim 5 wherein a main horizontal support is mounted on said base support between said spacedly mounted subassemblies, said main horizontal support being fitted with a plurality of impact bars each having a length mounted parallel to said direction of travel.

7. The cradle assembly of claim 5 wherein each said impact bar comprises:
    a first layer fabricated of a low friction material; and
    a second layer mounted to said first layer and fabricated from an impact absorbing elastomeric material.

8. The cradle assembly of claim 7 wherein each said impact bar further comprises a metal support member positioned within said layer and functioning as a structural support for said second layer.

9. The cradle assembly of claim 8 wherein said metal support member defines an upright "T"-shaped channel therein for slidably receiving a head of a retaining bolt therein, said retaining bolt being mounted on said angulated support.

10. The cradle assembly of claim 9 wherein said upright "T"-shaped channel extends along the length of said impact bar.

* * * * *